April 30, 1968     R. C. HILL     3,380,193
RETRACTABLE PROTECTOR FOR VEHICLE DOOR
Filed March 10, 1966
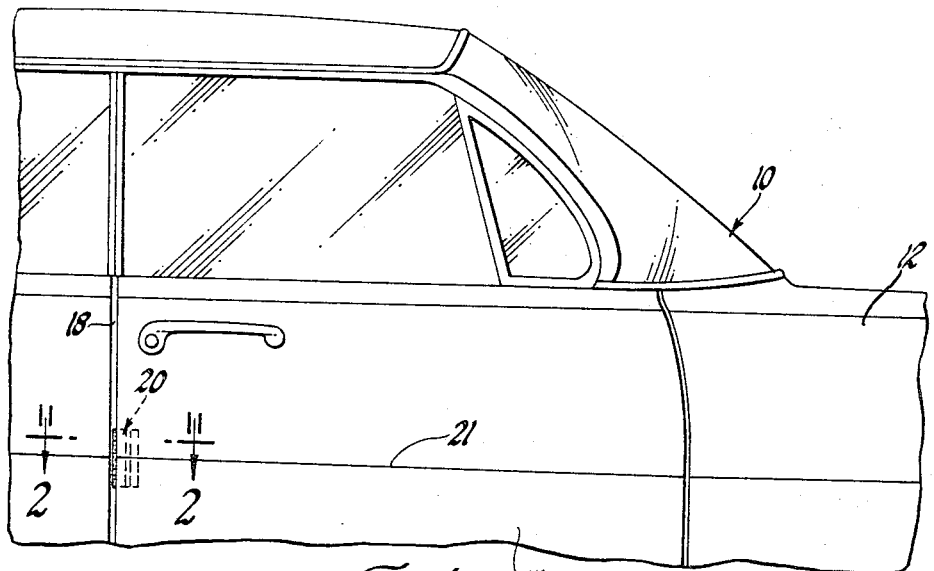
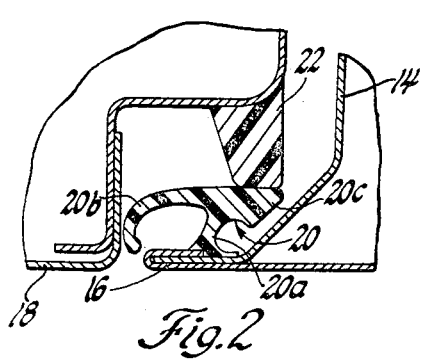
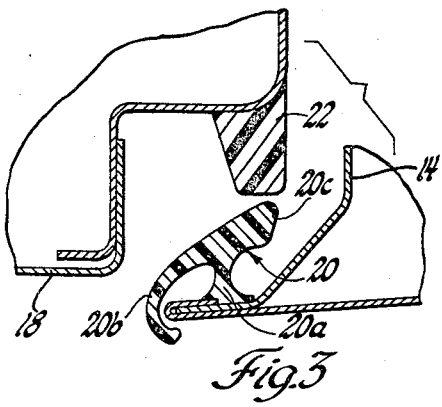
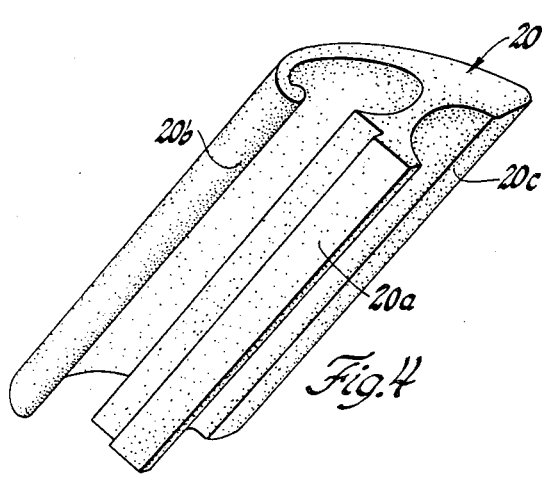
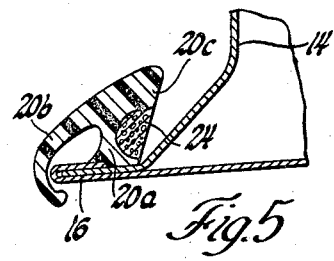
INVENTOR.
Ronald C. Hill
BY
W. S. Pettigrew
ATTORNEY United States Patent Office 3,380,193
Patented Apr. 30, 1968

3,380,193
RETRACTABLE PROTECTOR FOR VEHICLE DOOR
Ronald C. Hill, Pleasant Ridge, Mich., assignor to General Motors Corporation, Detroit, Mich., a corporation of Delaware
Filed Mar. 10, 1966, Ser. No. 533,349
6 Claims. (Cl. 49—462)

ABSTRACT OF THE DISCLOSURE

A protector for the free edge of a swinging door. A strip of resilient material is mounted on the free edge of the door inboard of the outer door surface. The strip is formed with a hook portion which is held by an actuator member in a retracted position inboard of the outer door surface when the door is closed. Upon opening the door, the resiliency of the material causes the hook portion to swing around the edge of the door, the edge being received in the bight of the hook.

---

This invention relates to a protector for a vehicle door and, more particularly, to a retractable protector for the free-swinging edge of an automobile door.

One feature of the invention is that it provides an improved protector for a vehicle door. Another feature of the invention is that it provides a retractable protector having a protector portion movable between an operative position, wherein it projects to a location outboard of the free edge of the door when the door is open, and an inoperative position, where it is located inboard of the door edge when the door is closed. A further feature of the invention is that the protector portion of the protector member is hook shaped, having a bight portion into which the free edge of the door is received when the door is open. Still another feature of the invention is that the protector member comprises an integral strip of resilient material biased toward its operative position and being deflected to its inoperative position when the door is closed.

Other features and advantages of the invention will be apparent from the following specification and drawings in which:

FIGURE 1 is a fragmentary side elevation of an automobile having the improved protector means mounted on the edge of the door;

FIGURE 2 is a fragmentary enlarged section taken along the line 2—2 of FIGURE 1, showing the protector in its inoperative position when the door is closed;

FIGURE 3 is a section similar to FIGURE 2 but showing the protector in its operative position when the door is open;

FIGURE 4 is an isometric view of the protector member removed from the door; and FIGURE 5 is a section through a door having a modified form of protector member mounted thereon.

When the door of an automobile is swung open, its free edge is apt to be marred and the paint therealong chipped if the free edge of the door strikes an adjacent object as, for example, a neighboring automobile, wall, or post, particularly when cars are parked closely together in parking lots or garages. Attempts have been made to avoid damage to the edge of the door by fixedly mounting door edge guard strips along the outboard surface of the free-swinging edge of the door. Fixedly mounted strips of this nature most often do not match the color of the automobile and thereby detract from the appearance of the car. Even if the colors match, the strips have an "added on" look since they are not flush with the surface of the door upon which they are mounted.

This invention provides a retractable protector member which is mounted on the inboard surface adjacent the free edge of the door in a position wherein the protector portion of the strip is in an operative position and projects to a location outboard of the free edge of the door when the door is open but is retracted to an inoperative position inboard of the free edge of the door when the door is closed so that, when in its inoperative position, the protector strip is entirely hidden from sight.

Referring now more particularly to the drawings, in FIGURE 1 an automobile designated generally as 10 has a body 12 and a door 14 which is hingedly mounted in conventional manner along its front edge on the automobile body so that the rear edge of the door is freely swingable between door-open and door-closed positions. As may be seen in FIGURES 2 and 3, the free edge of the door terminates at the juncture of the outer and end walls of the door in a hem flange 16, the inboard surface of which lies adjacent but spaced from a pillar 18 forming part of the automobile body.

A protector member designated generally as 20 is mounted, as by cementing, on the inboard surface of the hem flange 16 of the door. The protector member, in the form illustrated in the drawings, comprises three integral portions; i.e., a mounting portion 20a having a base and a stem, the base being cemented to the door, a hook-shaped protector portion 20b, and an actuating portion 20c. The protector member may be formed as a strip about four to six inches long and is formed of resilient material as, for example, polypropylene. The protector member is cemented to the door at a vertical location at or near the point of maximum outboard projection of the outer surface of the door, as indicated by the contour line 21. If desired, two or more protector strips may be provided, being located at the two or more locations of most extensive outboard projection of the outer surface of the door, although, in the automobile illustrated, the contour of the door is such that only one such strip is needed. An actuating member 22 is mounted, as by cementing, on the body pillar 18 at a location where it is adapted to engage the actuating portion 20c of the protector member when the door is closed.

As will be apparent from FIGURES 2 and 3, the deflector member 20 is mounted on the inboard surface of the door adjacent the free edge thereof in a position where the protector portion 20b of said member is in its operative position and projects to a location outboard of the free edge of the door when the door is open. The edge of the door is received in the bight of the hook-shaped protector portion 20b so that the protector member, rather than the painted edge of the door, will hit an adjacent object when the door is swung open. When the door is closed, the actuating portion 20c of the protector member engages the actuating member 22 on the body, causing the protector member to be deflected to its inoperative position wherein the protector portion 20b is located inboard of the outer surface of the door in the space between the edge of the door and the body pillar 18. In this inoperative position, the protector member is hidden from sight and, consequently, does not detract from the appearance of the car.

FIGURE 5 shows a modified form of the invention in which spring means comprising resilient foam material 24, as foam rubber, is mounted in the recess between the actuating portion 20c and the stem of the mounting portion 20a of the protector member to resiliently bias the protector portion 22 toward its operative position. In the form of the invention illustrated in FIGURES 2, 3, and 4, the inherent resiliency of the resilient material from which the member is made provides this function.

While I have shown and described two embodiments of my invention, it is capable of many modifications. Changes, therefore, in the construction and arrangement may be made without departing from the spirit and scope of the invention as set forth in the appended claims.

I claim:

1. In a vehicle having a swingable door with a free edge including an outer wall, an end wall joined thereto and set back from said free edge defining an inboard facing surface confronting a body pillar when the door is closed, protector means for the free edge of the door, comprising: a protector member having a protector portion and a mounting portion; means for mounting said protector member on the inboard surface of the door adjacent the free edge thereof in a position wherein the protector portion of said member is in operative position and projects to a location outboard of the outer wall of the free edge of the door when the door is open; and means operative upon closing the door for moving said protector portion to an inoperative position inboard of the outer wall of the free edge of the door when the door is closed, both the protector member and the means for moving the protector portion thereof being always located outside the door structure defined by the joined outer and end walls thereof.

2. In a vehicle having a swingable door with a free edge including an outer wall, an end wall joined thereto and set back from said free edge defining an inboard facing surface confronting a body pillar when the door is closed, protector means for the free edge of the door, comprising: a protector member having a protector portion, a mounting portion, and an actuating portion; means for mounting said protector member on the inboard surface of the door adjacent the free edge thereof in a position wherein the protector portion of said member is in an operative position and projects to a location outboard of the outer wall of the free edge of the door when the door is open; and means operative upon closing the door for moving said protector portion inboard of the free edge of the outer wall of the door when the door is closed, both the entire protector member and the means for moving the protector portion thereof being always located outside the door structure defined by the joined outer and end walls thereof.

3. Apparatus of the character claimed in claim 2, wherein said last-mentioned means includes an actuating member mounted on the body pillar and adapted to engage the actuating portion of the protector member when the door is closed to deflect the operating portion thereof to its inoperative position.

4. Apparatus of the character claimed in claim 2, wherein said protector member comprises an integral strip of resilient material biased toward its operative position, and wherein said last-mentioned means includes an actuating member mounted on the body pillar and adapted to engage the actuating portion of the protector member when the door is closed to deflect the operating portion thereof to its inoperative position.

5. In a vehicle having a swingable door with a free edge comprising joined outer and end walls, the inboard surface of said free edge lying adjacent a body pillar when the door is closed, protector means for the free edge of the door, comprising: a protector member having a protector portion which is hook-shaped with a bight into which the free edge of the door is received when the door is open, an actuating portion opposite the hook-shaped portion, a mounting portion, and a reduced pedestal portion interconnecting said protector and actuating portions with said mounting portion to allow pivoting of the protector and actuating portions; means for mounting said protector member on the inboard surface of the door adjacent the free edge thereof in a position wherein the protector portion of said member is in an operative position and projects to a location outboard of the outer wall of the free edge of the door when the door is open; and an actuating member mounted on the body pillar and adapted to engage the actuating portion of the protector member when the door is closed to pivot the operating portion of the protector member to its inoperative position inboard of the free edge of the outer wall of the door, both the entire protector member and the actuating member being always located outside the door structure defined by the joined outer and end walls thereof.

6. Apparatus of the character claimed in claim 5, including biasing means operative upon said protector member to bias it toward its operative position.

References Cited

UNITED STATES PATENTS

| | | | |
|---|---|---|---|
| 2,678,232 | 5/1954 | Barry | 49—462 |
| 3,243,222 | 3/1966 | Loughary et al. | 293—1 XR |
| 3,280,510 | 10/1966 | Vaux | 49—462 XR |

KENNETH DOWNEY, *Primary Examiner.*